April 1, 1958 H. P. RUTHERFORD 2,828,775
SHUTTLE TIPS
Filed Aug. 16, 1956 3 Sheets-Sheet 1
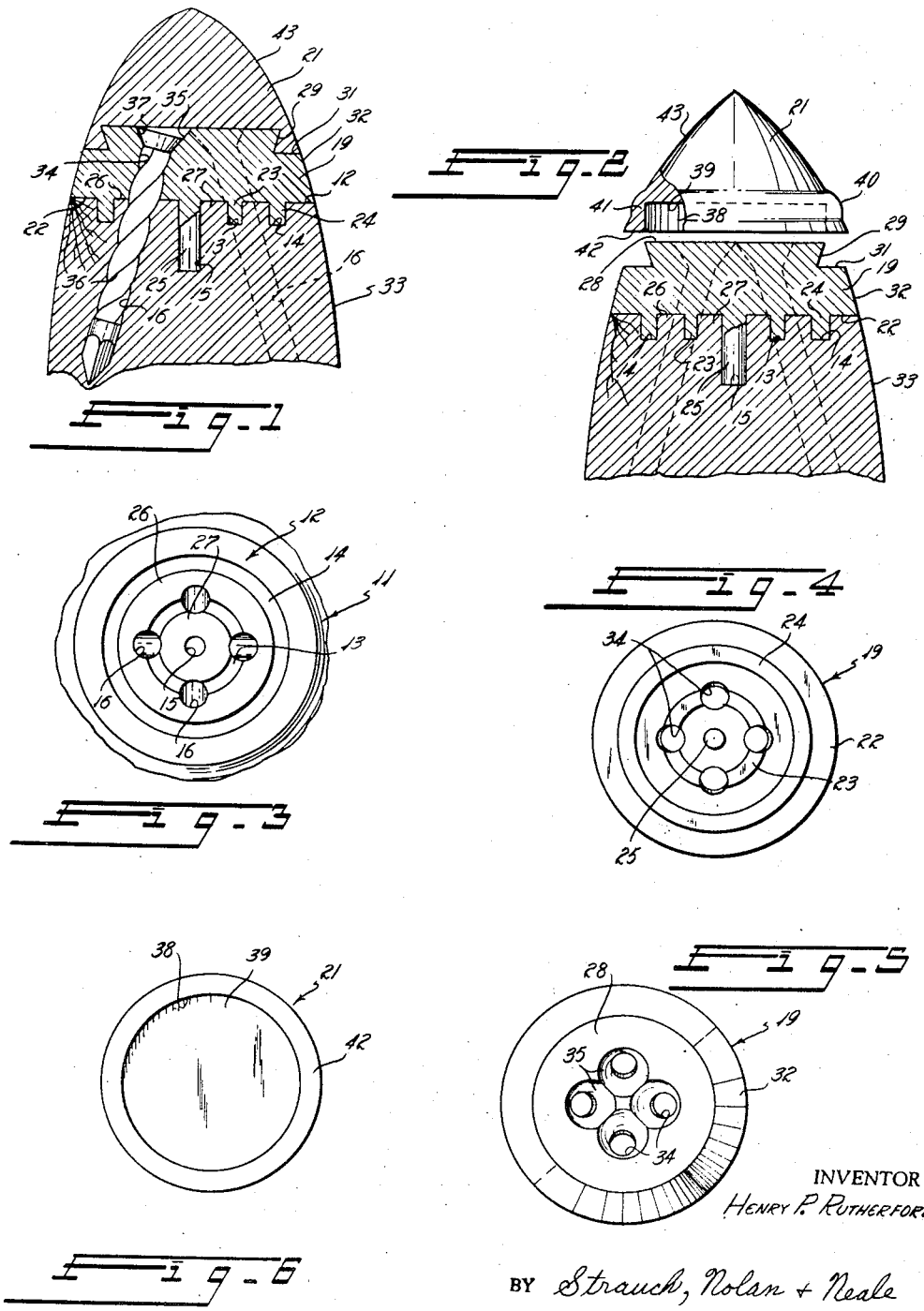
INVENTOR
HENRY P. RUTHERFORD
BY Strauch, Nolan + Neale
ATTORNEYS April 1, 1958   H. P. RUTHERFORD   2,828,775
SHUTTLE TIPS
Filed Aug. 16, 1956   3 Sheets-Sheet 2
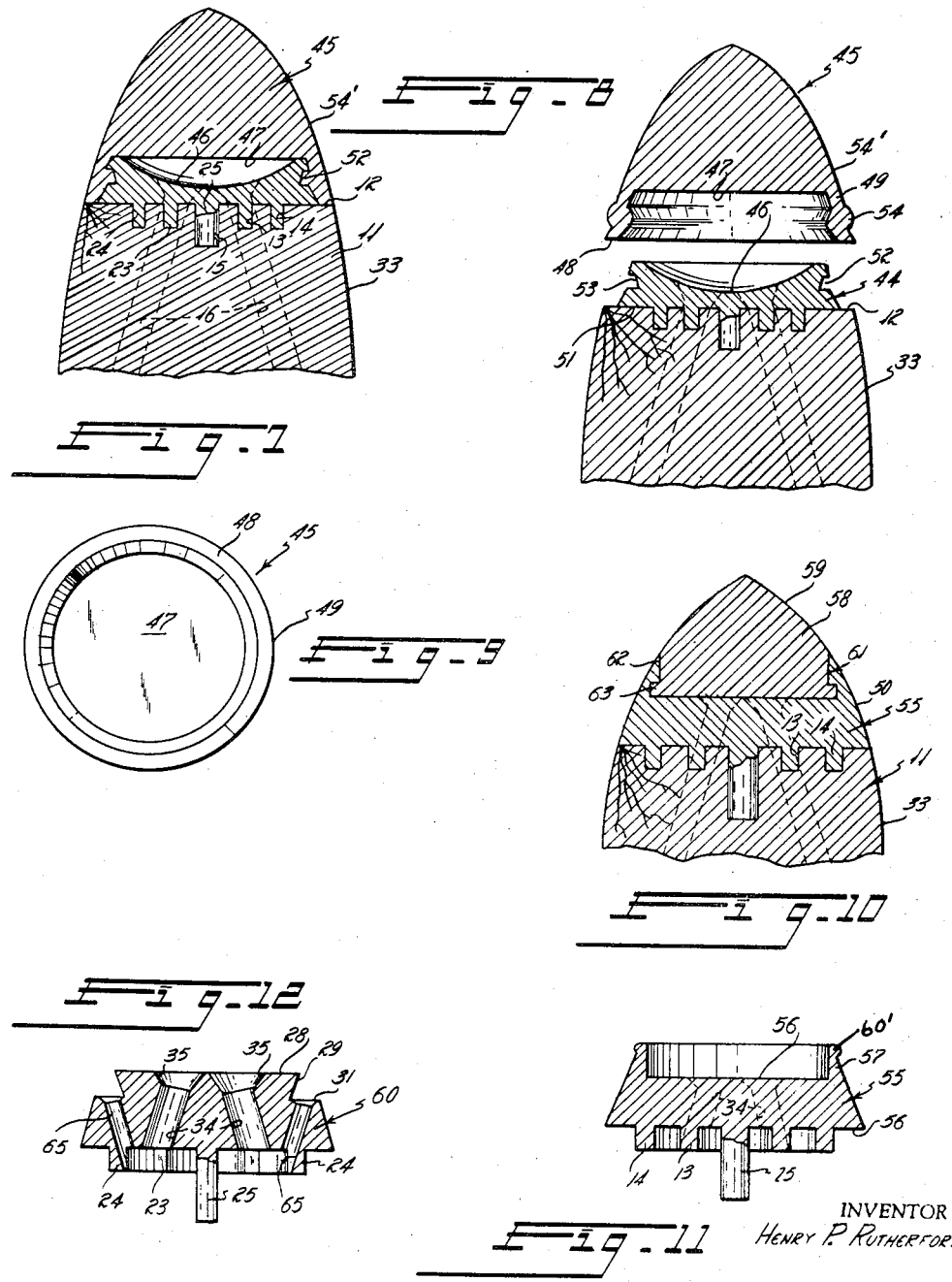
INVENTOR
HENRY P. RUTHERFORD
BY Strauch, Nolan + Neale
ATTORNEYS

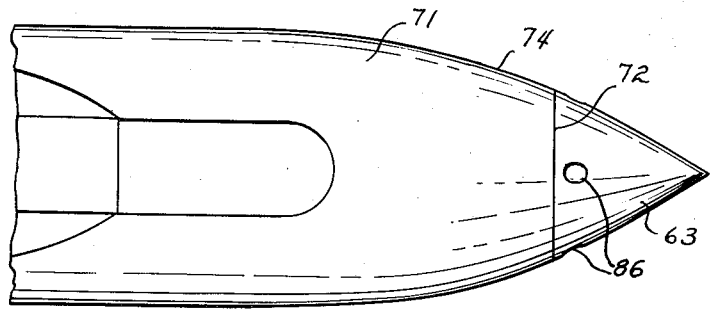
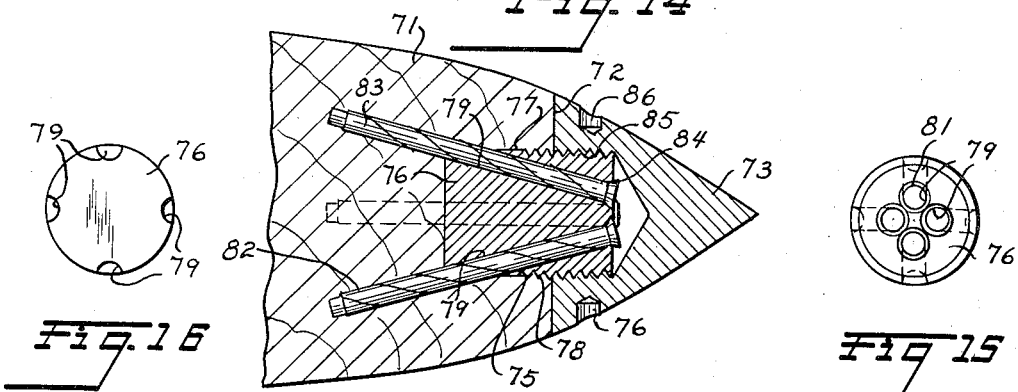
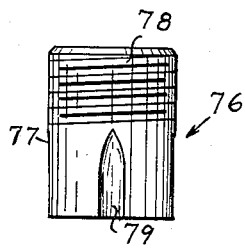
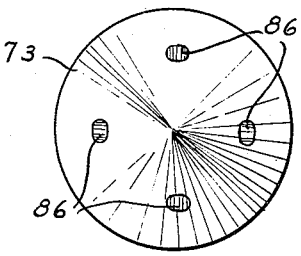
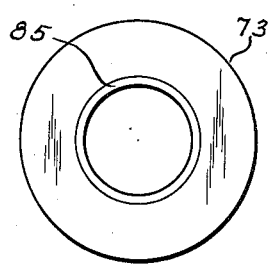

United States Patent Office 2,828,775
Patented Apr. 1, 1958

2,828,775
SHUTTLE TIPS

Henry P. Rutherford, Homestead, Fla., assignor to Multi Corporation, Miami, Fla., a corporation of Florida Application August 16, 1956, Serial No. 604,503

22 Claims. (Cl. 139—196)

This invention relates to the construction of shuttles used in textile apparatus and is particularly directed to improvements in shuttle tips. The present application is a continuation-in-part of my copending applications Serial No. 527,716, filed August 11, 1955, for Shuttle Tip Structure, and Serial No. 551,573, filed December 7, 1955, for Shuttle Tips.

It is the object of the present invention to provide a novel shuttle tip construction and mode of attachment to a shuttle body.

A further object of the invention is to provide a novel shuttle tip construction and mode of assembly wherein the tip structure comprises a base by which it is attached to the end of the shuttle body and a harder tip fixed to the base.

It is a further object of the invention to provide a novel two-part shuttle tip structure comprising a base and a hard tip which are peripherally interlocked and present a surface continuous with the adjacent surface of the shuttle body.

A further object of the invention is to provide a novel shuttle tip connection to the end of a shuttle body wherein the body end is grooved to receive tightly one or more flanges on the tip structure for increasing resistance to side thrust and other lateral forces incident to picker stick action and bobbin changing.

A further object of the invention is to provide a novel two-part shuttle tip structure consisting essentially of a base and hardened tip peripherally locked together by deformation of a skirt on one of them and pins angularly related to the shuttle body axis fixed to the base and projecting into said shuttle body.

It is a further object of the invention to provide a novel shuttle structure wherein a pin deflector member is mounted on the shuttle body end, angularly related pins pass through the deflector member into the material of the shuttle body, and a tip element is tightly secured upon the deflector member covering the outer ends of the pins.

A further object of the invention is to provide a novel shuttle construction wherein the shuttle body end is recessed to tightly receive a pin deflector member having a threaded portion projecting from the shuttle body, angularly related self-threading pins are driven through the deflector member into the material of the shuttle body, and a tip element is rigidly mounted on said projecting portion of the deflector member as by a threaded connection or some other mechanical and/or cemented interlock.

Further objects of the invention will appear as the description proceeds in connection with the appended claim and the annexed drawings wherein:

Figure 1 is an assembly view of an end of the shuttle according to a preferred embodiment of the invention;

Figure 2 is a separated view of the two-part shuttle tip structure before attachment of the tip to the base or pin deflector member;

Figure 3 is an end view of the shuttle body showing the grooves;

Figure 4 is a bottom view of the shuttle tip structure base showing the flanges that fit into the body grooves;

Figure 5 is a top view of the shuttle tip base of Figure 4;

Figure 6 is a bottom view of the tip before attachment;

Figure 7 is an assembly like Figure 1 of a different embodiment wherein the shuttle tip structure base is entirely surrounded by the skirt on the hardened tip in the assembly;

Figure 8 is a separated view of the base and tip of Figure 7 before attachment to each other;

Figure 9 is a bottom view of the tip of Figure 8;

Figure 10 is an assembly like Figure 1 of a further embodiment wherein the skirt is on the base of the shuttle tip structure;

Figure 11 is a sectional view through the base of Figure 10 before attachment to the tip;

Figure 12 is a section through a shuttle tip structure base that may be used in the Figure 1 assembly but wherein some of the pins that attach the base to the shuttle body are located in different parts of the deflector member and some are angled inwardly with respect to the axis;

Figure 13 is a fragmentary view of one end of a shuttle incorporating a further embodiment of the invention;

Figure 14 is an enlarged fragmentary view in section showing details of the deflector member and shuttle tip attachment;

Figure 15 is an outer end view of the deflector member of Figure 15;

Figure 16 is an inner end view of the deflector member of Figure 14;

Figure 17 is a side elevation of the deflector member of Figure 14;

Figure 18 is a top plan view of the shuttle tip; and

Figure 19 is an opposite end view of the tip of Figure 18.

The shuttle body 11 which is preferably of dense natural hard wood, laminated wood, or an equivalent hard or laminated plastic, or hard compressed fibrous material such as a compressed structure of cotton and glue, has a flat transverse end face 12. This end face is formed with one or more, here two, shallow annular rectangular cross section grooves 13 and 14 that are concentric with an appreciably deeper piloting pin bore 15.

A series of bores 16 are provided in the shuttle body grouped about the longitudinal shuttle axis and each preferably diverging from face 12 a suitable angle to the shuttle axis, the illustrated angle being about 16° although any workable holding angle can be used within the invention. Four such bores are shown but any desired number may be used. The bores 15 and 16 are all cylindrical.

The shuttle tip structure consists of a metal base or pin deflector member 19 and a metal tip 21. The base 19 has a flat bottom surface 22 to abut the shuttle body face 12 and two integral rectangular cross section depending axial flanges 23 and 24 adapted to fit into grooves 13 and 14 respectively. A central pilot pin 25 rigid with base 19 projects into bore 15. In assembly practice the circular grooves 13 and 14 are cut slightly undersize in width with respect to flanges 23 and 24 respectively so that, when the base 19 is forced onto the shuttle body end until surface 22 abuts face 12, the upstanding ribs 26 and 27 of the wooden body are radially compressed. This tight engagement of the flanges and grooves resists side thrust forces as will appear. The outer perimeters of surfaces 22 and face 12 are coextensive in the assembly.

The upper surface 28 of base 19 is preferably flat and circular and parallel to surface 22, and an undercut recess in the form of a shoulder having an inwardly inclined annular side face 29 and an intersecting annular flat face 31 is provided below surface 28. Between the outer circular peripheries of face 31 and surface 22 the body has an annular sloping peripheral surface 32 that as will appear in a smooth continuation of both the adjacent rounded smooth shuttle body surface 33 and the attached tip surface. The perimeter of surface 28 lies appreciably within that of shoulder face 31 for a purpose to appear.

A group of bores 34, here four in number, are drilled through base 19 from surface 28. These bores 34 are at the same angles and relative locations as the bores 16 of the shuttle body and are aligned with them in assembly. The upper ends of bores 34 are countersunk at 35.

After the base 19 has been pressed into the end of the shuttle body to seat the flanges in grooves 13 and 14, and the shuttle body and tip base bores are aligned, a plurality of attachment pins 36 are driven through bores 34 until their enlarged heads 37 locate in the countersinks 35 preferably below surface 28. These pins 36 may be smooth surfaced and snugly fit the bores 16 and 34 which may be of the same size, but an improved holding action is obtained if self threading drive screws are used as pins 36, with bores 34 slightly undersize with respect to the wing diameter of the screw spirals and bores 16 slightly undersize with respect to bores 34. As these drive screw pins are driven home they rotate and thread themselves into the aligned bores. This rigidly secures the base of the tip structure to the shuttle body. If desired other types of screws or nails may be used or straight sided pins may be driven through the bores.

The tip 21 of the two-part tip structure has a bottom central recess 38 having depth to flat bottom 39 about equal to the axial distance between surface 28 and shoulder face 31. A depending continuous peripheral skirt 41 from the otherwise solid tip has approximately the shape shown in Figure 2 before attachment to the base 19. The skirt includes a continuous bead of excess metal 40. In assembly, with base 19 secured to the shuttle body as above described, tip 21 is axially advanced to enclose the undercut shouldered part of the base within skirt 41 until the flat end face 42 of the skirt abuts shoulder face 31 and the assembly subjected to a mechanical rolling operation whereby the skirt is worked and deformed to approximately the condition shown in Figure 1, metal and excess metal displaced therefrom by the rolling or spinning operation solidly filling the undercut shoulder so as to provide a positive and permanent solid interlock between the tip and the base. In the same operation the outer peripheral surface 43 of the tip maintains its preformed generally conical shape and surfaces 32 and 43 in the final product are smooth continuations of shuttle body surface 33.

In practice this desirable result is obtained by having skirt 41 and base 19 of tough, strong but deformable metal, while the forward end of tip 21 must be hard where it is impacted by the picker stick. Thus all but the skirt 41 of preformed tip 21 is usually case hardened, and the peripheral surfaces of the skirt and base are rolled to smoothly conform to the tip end and the adjacent body so that a smooth neat continuous shuttle surface having no thread catching seams or projections is provided. The tip structure may be of any suitable metal such as steel or aluminum for example.

In actual tests this shuttle tip structure pulled out of a hard compressed plastic block only when the block cracked and failed at a pull of about 2500 pounds, a very superior holding action.

The surfaces 32 and 43 are herein referred to and in the claims substantially conical and it will be understood that this is intended to include surfaces of revolution of curved as well as straight lines as shown.

Referring now to the shuttle tip structure of Figures 7–9, the shuttle body 11 is grooved in the end face 12 as in Figure 1, and the bottom of base or pin deflector member 44 is provided with groove-fitting integral flanges 23 and 24 and pilot pin 25. Also the concave upper surface of base 44 is entered by a group of angular countersunk bores corresponding to those at 34 of Figures 1–6, and pierced by the same types of attachment pins as at 36 in Figures 1–6.

In Figures 7–9, however, the tip 45 has a deeper recess 46 having a flat bottom surface 47 parallel to flat rim surface 48 of depending skirt 49. The flat bottom surface 51 of base 44 which abuts face 12 is peripherally smaller than surface 22 of Figure 1, leaving in this embodiment an exposed annulus of wood face 12 to be abutted by skirt end face 48 in the assembly.

The undercut recess 52 of base 44 is actually a continuous groove with a forwardly diverging bottom surface 53. The skirt 49 is formed with a continuous bead 54 of excess metal which, when the tip 45 is axially brought together with the base 44 after the base 44 has been fixed to the shuttle body, and surface 48 is in abutment with face 12, is displaced by a mechanical rolling or equivalent operation that deforms skirt 49 to form an internal continuous rib 55 to solidly fill and interlock with undercut groove 52 while maintaining the outer peripheral surface 54' of the entire tip including the skirt as a smooth substantially conical continuance of body surface 33.

In this embodiment likewise the skirt and base are of tough deformable metal and the tip at least at its pointed end region is quite hard.

Referring now to the embodiment of Figures 10 and 11, the base or pin deflector member 55 is formed with a flat bottom surface 56 having depending integral flanges 13 and 14 and pilot pin 15. This base has a forwardly sloping substantially conical peripheral surface 50 and an upwardly extending skirt 57 shaped as in Figure 11 before assembly to include a continuous bead 60 of excess metal and surrounding the upper flat base surface 58 that is parallel to surface 56. In effect the annular (cylindrical) inner surface of the skirt 57 defines with surface 56 a recess into which, after the base 55 is secured to the shuttle body end as in the other embodiments, the solid tip 58 is placed for attachment.

Here tip 58 is a case hardened solid member. The conical surface 59 of its lower end is recessed at 61, this being done for example by cutting a reduced cylindrical surface 62 on the tip which also in effect forms a bottom radial flange 63. The bottom surface of tip 58 is flat, and when it seats on base surface 56 the deformable skirt 57 may be rolled or otherwise mechanically worked to solidly fill recess 61 to permanently and positively interlock the tip and base together while maintaining surfaces 50 and 59 as smoothly conical and continuous with body surface 33 as in the other embodiments.

In the embodiment of Figure 12, the base 64 is interchangeable with that at 19 in Figure 1 and of the same general structure with the same undercut recess formed by surfaces 29 and 31, the depending flanges 23 and 24, pilot pin 25 and peripheral surface 32. This type of base however is used with certain types of shuttle bodies with internal bobbin spaces that will permit for example only two bores 34 entering from surface 28. In this base there is provided two or more countersunk bores 65 circumferentially staggered with respect to bores 34 but shown in Figure 12 for convenience of illustration, that may enter through face 31 at the same angle as bores 34 but oppositely inclined with respect to the longitudinal axis of the shuttle body. It will be understood that the shuttle body is found with bores aligned with all of bores 34 and 65 as in all embodiments. Actually the attachment pins in all of the embodiments may be inclined in either direction with respect to the axis, the important thing being the angularity to resist straight out pull.

Referring to Figures 13–19 the shuttle body 71 has a flat end face 72 at right angles to the shuttle length, and a hard conical metal tip 73 is secured thereto with the external surface of the cone constituting a smooth continuation of the shuttle end surface 74.

Figure 14 shows the attachment details. Centrally of face 72 a bore 75 is formed in the solid wood of body 71 and a solid metal deflector member 76 is mounted in that bore. Member 76 is essentially a solid plug having a smooth cylindrical portion 77 and a threaded end portion 78 which projects axially from face 72. Member 76 has a tight force fit in and fills bore 75.

A plurality of straight bores 79 are drilled generally longitudinally through member 76. These bores are here four in number which is preferable for high speed shuttles operating at 160–200 picks per minute and they are equidistantly arranged about the central axis of member 76 at the same angle, which is about 15° to that axis. Each bore 79 terminates in a conical countersink 81 at one end and emerges angularly through the side of the member as shown in Figure 17.

As in the other embodiments bores 82 are provided in the solid wood of the shuttle body in axial alignment with bores 79. These bores 82 are usually drilled into the shuttle body after member 76 has been secured in place and bores 79 serve as drill guides.

A plurality of steel nail-like fastener pins 83 extend through bores 79 and 82 with their enlarged heads 84 seated in countersinks 81. Bores 79 are just large enough in diameter to permit force fit passage of pins 83 and bores 82 are slightly undersized so that pins 83 will have a friction or threaded fit therein. It is preferable to provide pins 83 with longitudinally spiral surface ridges as shown so that they thread themselves into the wood as they advance into bores 82 and thereby greatly increase the holding action.

After the deflector member 76 and pins 83 are installed, tip 73 is mounted by its internally threaded bore 85 onto the threaded end 78 of the deflector member and rotated until tightly seated against face 72. A series of deep radial side depressions 86 are formed in surface of the tip for two fold purpose. First, they enable the tip to be gripped and rotated by a suitable tool for mounting on the shuttle, and secondly, after the tip 73 has been turned suitably tight on its threads, a punch or the like is inserted through each depression 86 and given a hammer blow which stakes or deforms the tip metal at the bottom of each depression 86 into thread locking engagement with the deflector member 76. Furthermore, since tip 73 is made of harder metal than deflector member 76 the latter is also deformed during the operation and the attendant deformation of member 76 deforms bores 79 sufficiently to interlock about the portions of the fastener pins 83 therein so that the entire assembly is permanently secured together.

Also it has been found desirable to provide a strong adhesive or cement in the threads at 78, and 85, such being applied as a liquid during assembly and allowed to harden with the parts in tight engagement. A particularly useful cement is one made of powdered steel in a sticky resin vehicle sold under the trademark Devcon. If desired the same or other cement may be used to hold deflector member 76 in bore 75, and pins 83 may be adhesive coated prior to insertion into the bores.

The above construction is especially useful for high speed shuttles. For low speed shuttles of about 100–135 picks per minute it may not be necessary to threadedly attach the tip 73 to the deflector member, and instead they may be provided with mating longitudinal splines in bore 85 and portion 78 respectively by which tip 73 may be merely pushed onto the deflector member into contact with face 72, suitable cement being provided between the splines to hold the deflector plate and tip tightly together in the final assembly when hardened.

While the shuttle body has been described as of wood and the invention is of special merit as applied to the attachment of the shuttle tips to natural wood it will be appreciated that the attachment constructions herein shown and described may all be used to attach shuttle tips to shuttle bodies of laminated wood and plastic material as well as bodies made of cotton or like fibers distributed through a hardened adhesive or resin mass.

In any event in all embodiments I have provided a shuttle tip attachment arrangement wherein a series of shuttle tip pins are imbedded in the wood or like material of the shuttle body end to provide a good bond with wide distribution of picker stick impact forces and attendant internal friction, and in the various embodiments the pins are inclined or deflected into optimum holding and non-splitting relation with the wood structure. The various pin arrangements may be employed in any desired combination of those illustrated in the drawing, the angularity and deflection angles varied and the number and location of pins selected all according to the material and structure of the shuttle body and the severity of the expected working conditions of the shuttle.

There has therefore been provided in the invention a novel permanently locked two-part shuttle structure which in addition to the angularly disposed attachment pins has an interlocked connection with the end of the shuttle body to increase resistance to side thrust forces such as those incident to picker stick impact and bobbin replacement.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a shuttle for textile apparatus, a shuttle body made of wood, other fibrous material or non-metallic plastic and having a transverse end face, a rigid hard generally conical wear resistant tip assembly mounted on said end face so that the adjacent surfaces of said shuttle body and tip assembly are smooth continuations of each other, a plurality of bores formed in said body entering into said end face, said bores each being inclined at a small angle to the longitudinal axis of the shuttle body and distributed about that axis, a rigid deflector member in said tip assembly mounted at said shuttle body end face and formed with a plurality of bores aligned with the body bores, and a plurality of rigid tip assembly attachment pins extending through said aligned bores.

2. In the shuttle defined in claim 1, said deflector member being seated in said end face and said tip assembly also comprising a generally conical element permanently attached to said deflector member.

3. In the shuttle defined in claim 2, said deflector member being tightly mounted in a recess in said end face and having an internal screw threaded connection with said tip element so that said tip element extends entirely over said deflector member and the ends of said fastener pins and may be drawn tight with said end face.

4. In the shuttle defined in claim 2, said deflector member and tip element having mechanical interlocking formations.

5. In a shuttle for use in textile apparatus, a shuttle body having a transverse end face, a shuttle tip structure of metal having a peripheral surface that is effectively a smooth continuation of the shuttle body surface, a plurality of attachment pins securing said tip structure to said body, said pins being disposed in said tip structure and said body angularly with respect to the longitudinal axis of said body, and cooperating axial flange and groove means on said body end face and tip structure resisting side thrust forces incident to shuttle operation in said apparatus.

6. In the shuttle defined in claim 5, at least one annular groove in the body face, and a corresponding rigid axial flange on said tip structure snugly interfitted within said groove.

7. In the shuttle defined in claim 5, at least two concentric grooves in said face, and a corresponding number of rigid axial flanges on said tip structure, said flanges and grooves being of such relative size that upon assembly the tip structure abuts said face with said flanges substantially filling the grooves and radially compressing the ribs of the shuttle body material between them.

8. In a shuttle assembly wherein a metal shuttle tip structure is fixed upon the end of a shuttle body of wood, plastic or like material having the required physical characteristics for textile shuttles, said body having a transverse end face, and said tip structure comprising a deflector member seated in said end face and projecting axially therefrom, a plurality of attachment pins extending through said member and body at acute angles with respect to the longitudinal axis of the shuttle body, and a tip element mounted on the projecting part of said member and permanently mechanically interlocked therewith.

9. In the shuttle assembly defined in claim 8, at least one annular groove in said end face, and an axial flange rigid with said deflector member extending snugly within said groove.

10. In the shuttle assembly defined in claim 8, two concentric spaced grooves in said end face defining a shuttle body end rib between them, and two rigid axial flanges on said deflector member disposed in said grooves and radially compressing said shuttle body rib between them.

11. In a shuttle structure, a shuttle body having a transverse end face, a shuttle tip structure comprising a metal deflector member rigidly attached to said end face and a hardened metal tip member attached to said deflector member, one of said members being peripherally recessed and the other having a peripheral skirt deformed to interlock within said recess while maintaining a continuous smooth external surface on the body and tip structure.

12. In the shuttle structure defined in claim 11, the deflector member having an undercut recess and the tip member being provided with said skirt axially extending therefrom.

13. In the shuttle structure defined in claim 12, said skirt being such as to completely surround said deflector member and axially abut said face in the assembly.

14. In the shuttle structure defined in claim 11, said recess being formed in the tip member and said deflector member having a peripheral skirt within which said tip member is seated for attachment thereto.

15. In the shuttle structure defined in claim 11, each said skirt having prior to assembly a continuous bead of excess metal for displacement into said recess.

16. A textile shuttle comprising a body of non-metallic wood-like material, said body having a tapered end terminating in a transverse face, a plug-like deflector member seated in a recess in said face and formed with a plurality of through bores extending at acute angles with respect to the axis of the shuttle body, a plurality of fastener pins extending through said bores into a plurality of aligned bores in said shuttle body, and a shuttle tip element seated on said face mechanically interlocked tight with said deflector member and forming a smooth surface continuation of the tapered body end.

17. In the shuttle defined in claim 16, said tip element having a deformed threaded interlock with said deflector member.

18. In a shuttle for textile apparatus, a shuttle body made of wood, other fibrous material or non-metallic plastic and having a transverse end face, a rigid hard generally conical wear resistant tip assembly mounted on said end face so that the adjacent surfaces of said shuttle body and tip assembly are smooth continuations of each other, a plurality of bores formed in said body entering into said end face, said bores each being inclined at a small angle to the longitudinal axis of the shuttle body and distributed about that axis, a rigid deflector member in said tip assembly tightly mounted in a recess in said shuttle body end face and formed with a plurality of bores aligned with the body bores, and a plurality of rigid tip assembly attachment pins extending through said aligned bores, said deflector assembly including a hard metal conical tip element and said deflector member having an internal tight screw threaded connection with said tip element so that said tip element extends entirely over said deflector member and the ends of said fastener pins and may be drawn tight against said end face.

19. In a shuttle assembly wherein a metal shuttle tip structure is fixed upon the end of a shuttle body of wood, plastic or like material having the required physical characteristics for textile shuttles, said body having a transverse end face formed with a central recess, and said tip structure comprising an axially extending plug-like portion tightly mounted in the recess in said end face and a tip portion rigid with said plug-like portion, and a plurality of attachment pins extending straight through said tip structure into said body at acute angles with respect to the longitudinal axis of the shuttle body, and said tip portion being tightly axially engaged with said end face in surrounding relation to said recess and having a conical external surface that is a substantial smooth continuation of the adjacent surface of the shuttle body.

20. A shuttle comprising an elongated wooden body having a transverse end face, a plurality of small diameter bores grouped about the shuttle axis and opening into said face, said bores being disposed at small acute angles to said axis, a rigid deflector member mounted on said end at said face having a plurality of holes inclined and aligned correspondingly to said bores, a hard wear resistant shuttle tip, and a plurality of rearwardly extending rigid attachment pins that are directed by said holes into said bores as they pass through said member during assembly of the shuttle tip with the wooden body.

21. In a shuttle for textile apparatus, a shuttle body made of wood or the like and having a transverse end face, a rigid hard generally conical wear resistant tip assembly mounted on said end face so that the adjacent surfaces of said shuttle body and tip assembly are smooth continuations of each other, a plurality of bores formed in said body entering into said end face, said bores each being inclined at a small angle to the longitudinal axis of the shuttle body and distributed about that axis, a plurality of rigid tip assembly attachment pins extending from said tip assembly through said bores and a rigid deflector member mounted at said shuttle body end face and formed with a plurality of suitably aligned bores through which extend said fastener pins.

22. In the shuttle defined in claim 21, said tip assembly comprising a generally conical element rigid with said deflector member.

References Cited in the file of this patent

UNITED STATES PATENTS

| 2,205,025 | Balfour | June 18, 1940 |

FOREIGN PATENTS

| 22,671 | Great Britain | of 1907 |
| 475,646 | Germany | Apr. 18, 1929 |
| 607,584 | Great Britain | Sept. 1, 1948 |
| 630,716 | Great Britain | Oct. 19, 1949 |

U. S. DEPARTMENT OF COMMERCE
PATENT OFFICE

CERTIFICATE OF CORRECTION

Patent No. 2,828,775     Henry P. Rutherford     April 1, 1958

It is hereby certified that error appears in the printed specification of the above numbered patent requiring correction and that the said Letters Patent should read as corrected below.

Column 7, line 61, for "ber" read --member--.

Signed and sealed this 1st day of July 1958.

(SEAL)
Attest:
KARL H. AXLINE
Attesting Officer

ROBERT C. WATSON
Commissioner of Patents